US007292989B2

(12) United States Patent
DeMaggio

(10) Patent No.: US 7,292,989 B2
(45) Date of Patent: Nov. 6, 2007

(54) METHOD AND SYSTEM FOR MANAGING CARRIER OPERATIONS

(75) Inventor: James DeMaggio, Grosse Ile, MI (US)

(73) Assignee: Ford Motor Company, Dearborn, MI (US)

( * ) Notice: Subject to any disclaimer, the term of this patent is extended or adjusted under 35 U.S.C. 154(b) by 1209 days.

(21) Appl. No.: 10/063,123

(22) Filed: Mar. 22, 2002

(65) Prior Publication Data

US 2002/0138352 A1 Sep. 26, 2002

Related U.S. Application Data

(60) Provisional application No. 60/278,103, filed on Mar. 23, 2001, provisional application No. 60/278,205, filed on Mar. 23, 2001, provisional application No. 60/278,206, filed on Mar. 23, 2001, provisional application No. 60/278,207, filed on Mar. 23, 2001, provisional application No. 60/278,209, filed on Mar. 23, 2001.

(51) Int. Cl.
G06F 9/46 (2006.01)
(52) U.S. Cl. .......................................................... 705/8
(58) Field of Classification Search ..................... 705/8
See application file for complete search history.

(56) References Cited

U.S. PATENT DOCUMENTS 5,063,506 A * 11/1991 Brockwell et al. ............. 705/7
5,809,479 A * 9/1998 Martin et al. ................. 705/11
6,341,266 B1 * 1/2002 Braun ............................ 705/7
2002/0082771 A1 * 6/2002 Anderson .................... 701/209
2002/0103726 A1 * 8/2002 Jones et al. .................... 705/28
2003/0009361 A1 * 1/2003 Hancock et al. ............... 705/7
2003/0178481 A1 * 9/2003 Kondo et al. ................ 235/375

FOREIGN PATENT DOCUMENTS

JP 9-05099 A * 1/1997

OTHER PUBLICATIONS

Mukhopadhyay, Samar K. "Optimal Scheduling of Just-in-Time Purchase Deliveries." International Journal of Operations & Production Management, vol. 15, No. 9, pp. 56-69, 1995.*

* cited by examiner

Primary Examiner—Susanna M. Diaz
(74) Attorney, Agent, or Firm—Gary A. Smith; Brooks Kushman P.C.

(57) ABSTRACT

The method and system of the present invention use a plurality of timing data to determine a transportation schedule or schedule(s). The transpiration schedule or schedules include a series of precise timing windows for pickup and delivery of products moving from suppliers to plants. In addition, the products may move thorough cross docks and other suppliers. Further, the suppliers in the system may belong to different tiers in the supply chain. The schedule(s) are then transmitted to all of the effected parties. If the schedule(s) are not accepted and/or certain scheduling variables change, the schedule(s) may be recalculated and retransmitted.

19 Claims, 9 Drawing Sheets

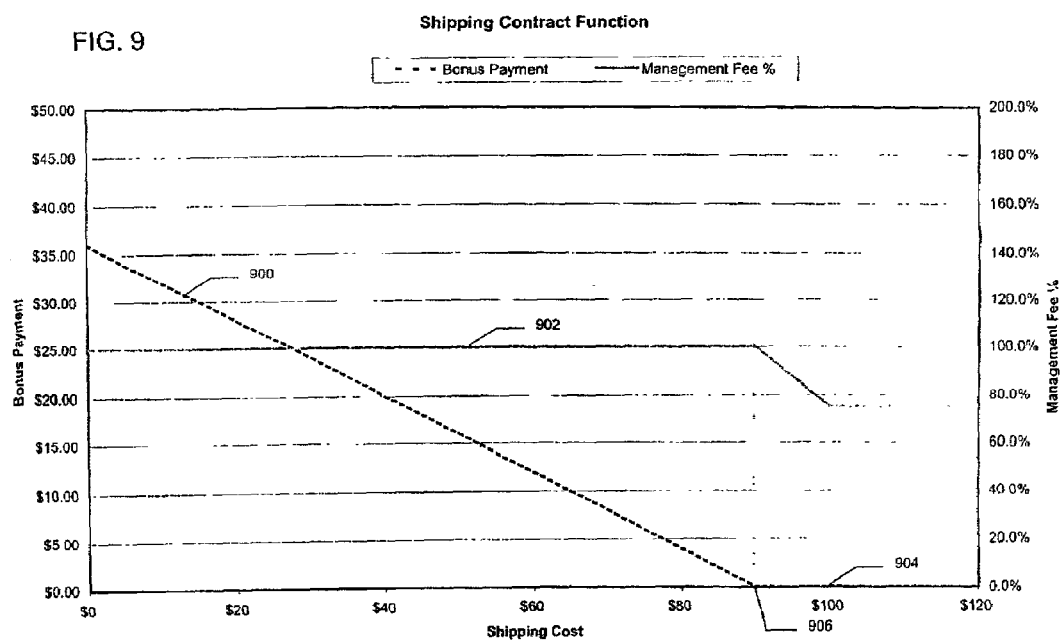

METHOD AND SYSTEM FOR MANAGING CARRIER OPERATIONS

CROSS REFERENCE TO RELATED APPLICATIONS

This application claims priority to provisional application No. 60/278,103, provisional application No. 60/278,205, provisional application No. 60/278,206, provisional application No. 60/278,207, and to provisional application No. 60/278,209, all of which were filed on Mar. 23, 2001 and are incorporated herein by reference.

BACKGROUND OF THE INVENTION

1. Technical Field of the Invention

The system described herein relates in general to transportational logistics systems and in particular to methods and system for efficiently routing products from a plurality of suppliers to a common plant destination in a cost effective manner.

2. Background of the Invention

The need to transport products from one location to another in a cost efficient manner is an old problem. However, in our "every man for himself" world, companies tend to minimize their own shipping expenditures without regard to certain externalities. For example, company A may use a small truck for small shipments and a large truck for large shipments because the shipping costs associated with one large truck is typically lower than the shipping costs associated with two small trucks. However, what is ignored is that company A may be driving that small truck down the road side-by-side with company B's small truck.

Unless company A and company B are traveling substantially the same routes (as opposed to partially overlapping routes) and they are aware of this fact, they are unlikely to combine their resources. Further, company A would generally be unwilling to increase its shipping costs in order to reduce company B's shipping costs, even if the net result was an overall decrease in shipping costs. Although these externalities may be accounted for contractually, typically they are ignored.

Of course, certain common distribution centers and common carriers are used by competitors to achieve some level of synergy. However, these systems are based on a "two point" model. Each supplier ships his products based solely on the starting and ending points. Specifically, the supplier typically accepts orders from customers (the ending points) and reconciles those orders with his manufacturing flow (the starting point). No consideration is given to when the common distribution center and/or common carrier would prefer to move the product. The supplier just expects his product to be shipped from point A to point B whenever he chooses. This business model is convenient for the supplier, but this convenience comes at a price.

SUMMARY OF INVENTION

In one aspect, the invention is directed to a method of transporting goods. The method includes the step of determining that a first lot of goods and a second lot of goods are required at a plant location at a plant time. The method further comprises the step of determining that a time required to travel from a cross dock location to the plant location is between a first time and a second time. Still further, the method comprises the steps of determining that a time required to travel from a first supplier location to the cross dock location is between a third time and a fourth time, and determining that a time required to travel from a second supplier location to the cross dock location is between a fifth time and a sixth time. The first supplier location is preferably associated with the first lot of goods, and the second supplier location is preferably associated with the second lot of goods. The first transportation schedule information may then be transmitted to a first supplier of the first lot of goods. The first transportation schedule information preferably includes a first pickup time window based on (i) the plant time window, (ii) the first time, (iii) the second time, (iv) the third time, and (v) the fourth time. In addition, the first transportation schedule information may include an identifier associated with the first lot of goods. Similarly, the second transportation schedule information may then be transmitted to a second supplier of the second lot of goods. The second transportation schedule information preferably includes a second pickup time window based on (vi) the plant time window, (vii) the first time, (viii) the second time, (ix) the fifth time, and (x) the sixth time. In addition, the second transportation schedule information may include an identifier associated with the second lot of goods. Subsequently, the first lot of goods may be picked up at the first supplier location during the first pickup time window and delivered to the cross dock location. Similarly, the second lot of goods may be picked up at the second supplier location during the second pickup time window and delivered to the cross dock location. The first and second lot of goods may then be combined into a common transportation vehicle at the cross dock location and delivered to the plant location during a plant time window.

In another aspect, the invention is directed to a system for generating a transportation schedule used in transporting goods from a first supplier location and a second supplier location to a plant location. The system includes an input device which receives logistics data. The logistics data is preferably indicative of a desired plant arrival time, a time required to travel from a cross dock location to the plant location, a time required to travel from a first supplier location to the cross dock location, and a time required to travel from a second supplier location to the cross dock location. The system also includes an output device which generates the transportation schedule and a controller operatively coupled to the input device and the output device. The controller preferably includes a processor and a memory. In such an instance, the controller is programmed to receive the logistics data and determine the transportation schedule based on the logistics data. Subsequently, the controller causes the output device to generate the transportation schedule.

In yet another aspect, the invention is direct to a system that includes a memory and a computer program stored in the memory. The computer program includes a first program portion that, when the computer program is executed by a computer coupled to the memory, causes the computer to receive logistics data. The logistics data is preferably indicative of a desired plant arrival time at a plant location, a time required to travel from a cross dock location to the plant location, a time required to travel from a first supplier location to the cross dock location, and a time required to travel from a second supplier location to the cross dock location. The computer program also includes a second program portion that, when the computer program is executed by a computer coupled to the memory, causes the computer to determine a transportation schedule based on the logistics data. Still further, the computer program includes a third program portion that, when the computer program is executed by a computer coupled to the memory, causes the computer to transmit a first section of the transportation schedule to the plant location, a second section of the transportation schedule to the first supplier location, and a third section of the transportation schedule to the second supplier location.

In a further aspect of the invention, a method for shipping an item comprises the steps of storing a unique identifier associated with the item in a manifest, relaying the unique identifier to a logistics station, assigning a destination to the unique identifier, relaying the destination to an operator of the vehicle, and delivering the item to the destination.

In accordance with a possible preferred embodiment of the invention, the method may include the additional steps of assigning a location code to the unique identifier and relaying the location code to the logistics station. Further, a second location code may be assigned to the unique identifier upon delivery of the item to the destination, with the unique identifier including the second location code being relayed to the logistics station. A new destination may be relayed to the operator of the vehicle, and the manifest may be updated.

Preferably, a shipping tag associated with the item is provided, with the shipping tag being capable of storing the unique identifier in a machine readable form. The unique identifier may be read using machine reading means. The destination may be relayed to the operator of the vehicle upon scanning the shipping tag. All relaying steps may be carried out using wireless transmission.

In accordance with another aspect of the invention, a method for shipping an item comprises the steps of providing a shipping tag associated with the item, with the shipping tag being capable of storing data including location data in a machine readable form, reading the data, relaying the data to a logistics station, determining a destination for the item, and relaying the destination to an operator of a delivery vehicle.

In accordance with a further aspect of the invention, a system for shipping an item between an origin and one of a plurality of possible plant destinations using a vehicle comprises a logistics station including an input device receiving manifest data, the manifest data being indicative of at least one item characteristic and of an item location, the logistics station having logistics data indicative of item requirements at a destination, the logistics station further including an output device for generating a desired plant destination, the logistics station further including a controller operatively coupled to the input device and the output device, the controller comprising a processor and a memory, the controller being programmed to receive the manifest data, the controller being programmed to determine the desired plant destination from a plurality of possible destinations, and the controller causing the output device to generate the desired plant destination, and a receiver for obtaining manifest data indicative of a location of the item from a shipping label adapted to store location data in machine readable form, the shipping label being operatively associated with the item. A transmitter is provided for relaying data indicative of the desired destination from the logistics station to an operator of the vehicle, whereby the operator of the vehicle delivers the item to the desired destination.

BRIEF DESCRIPTION OF DRAWINGS

These and other features and advantages of the present invention will be apparent to those of ordinary skill in the art in view of the detailed description of the preferred embodiment which is made with reference to the drawings, a brief description of which is provided below.

FIG. 9 is a chart representing an illustration of a performance oriented shipping contract.

DETAILED DESCRIPTION

In general, the system and method disclosed herein is based on an "overall flow chain" model. Every shipping variable and decision is factored into an overall net efficiency, not a localized efficiency based on a particular sender and/or a particular recipient. All carriers are managed in a cooperative manner using pick-up and drop-off time windows. Although this management system uses precise timing windows, schedules and routes are flexible and may be dynamically altered to account for predetermined variances and unforeseen developments. Suppliers from multiple tiers in the supply chain may share resources and efficiencies.

Figure 1:
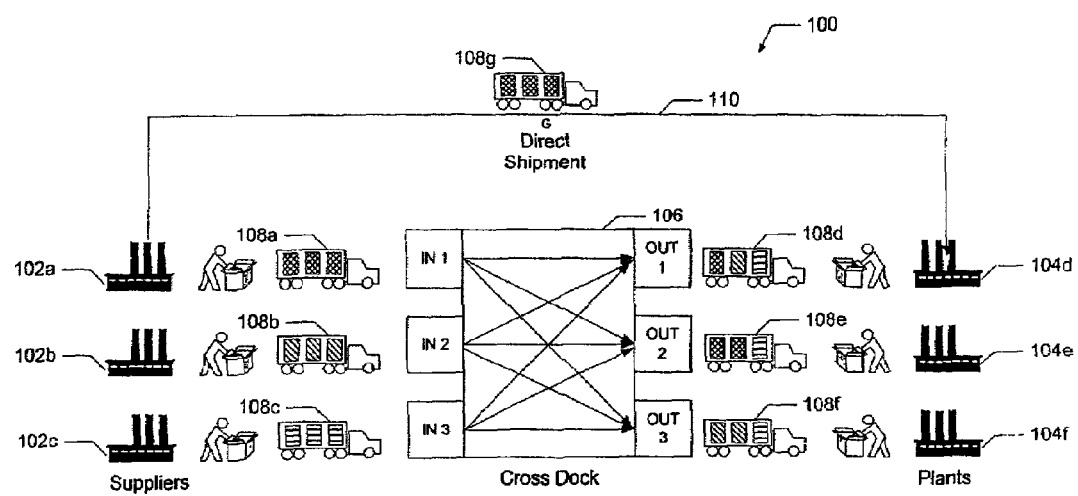
FIG. 1 is a block diagram of a logistics system including suppliers, trucks, plants, and a cross dock.

A block diagram of a logistics system 100 is illustrated in FIG. 1. The system 100 includes a plurality of suppliers 102 and a plurality of plants 104. Goods produced by the suppliers 102 must be transported to the plants 104 for assembly into other goods. For example, a plant 104 may manufacture an automobile, and, in so doing, receive various parts, that go into producing the automobile, from various suppliers 102.

Central to this system is a cross dock 106 (also referred to as an origin distribution center or ODC). The cross dock 106 facilitates the distribution function by providing a location where different trucks 108 carrying loads headed for a common destination may exchange goods and is well known. In this manner, several individual trips to plants 104 by trucks 108 with partially empty loads are avoided. Preferably, a plurality of cross docks 106 are deployed at central locations (not shown). Of course, full (or nearly full) shipments headed for a single destination would likely be shipped via a direct route 110.

In prior art systems, trucks 108 leaving a cross dock 106 wait until they are full (or nearly full e.g., 85% full). For example, truck 108d may make a daily trip to plant 104d with parts from suppliers 102a and 102b. Accordingly, truck 108d waits for the parts from trucks 108a and 108b to arrive at the cross dock 106. If supplier 102a ships his parts at 10:00 AM and the trip is approximately one hour long, parts from supplier 102a will arrive at approximately 11:00 AM. If supplier 102b ships his parts between 1:00 PM and 2:00 PM and the trip is twenty minutes long, parts from supplier 102b will arrive between 1:20 PM and 2:20 PM. In order to minimize costs associated with temporarily storing and handling materials at the cross dock 106, truck 108d will have to wait from 11:00 AM to as late as 2:20 PM before leaving the cross dock 106.

Trucks 108 that are not moving increase the cost of shipping. Further, the uncertainty associated with the ultimate shipment to a plant 104 requires the plant 104 to keep a certain amount of inventory on hand to absorb the fluctuations in deliveries. This inventory also increases costs. Exacerbating the situation, if truck 108d is also waiting for parts from supplier 102c, and supplier 102c does not have a consistent shipping schedule, the entire shipment (including parts from supplier 102a, supplier 102b, and supplier 102c) is delayed.

In order to reduce these costs, the present system dynamically schedules a small time window for every shipment to and from each cross dock 106 using networked software. Scheduling variables include the size and number of available trucks 108, the times and locations of the trucks 108, the locations of suppliers 102, the cube size and frequency of supplier shipments required by the plant 104, the size and availability of storage, weather conditions, past performance, future production, and any other variable which may affect delivery.

Preferably, each supplier 102 is assigned one pick up time per day. This pick up time may be determined by the plant 104 and/or the supplier 102, but is generally agreed to at least one day in advance. In many instances, the agreed upon time is the same every day. However, varying times and unplanned for circumstances may be dynamically scheduled.

Figure 2:
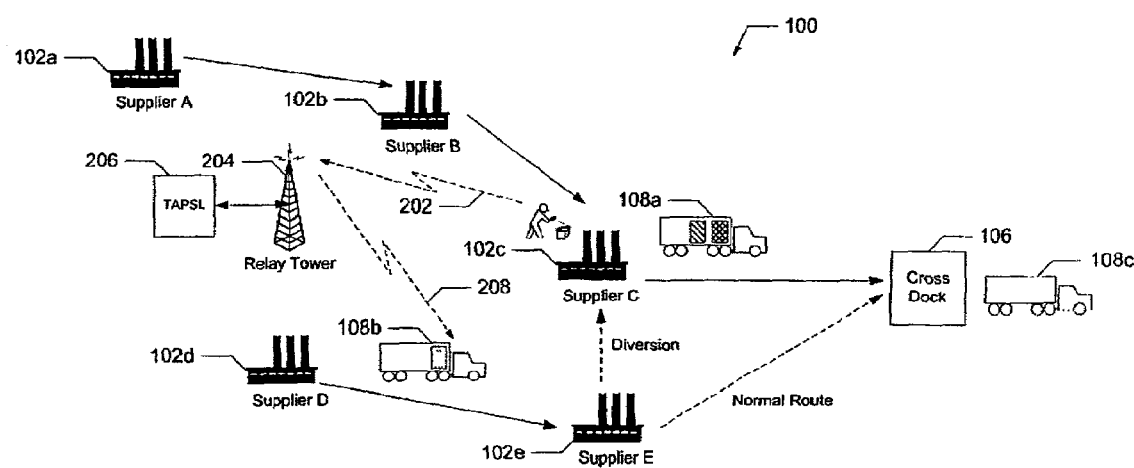
FIG. 2 is a block diagram of the logistics system of FIG. 1 showing the same truck making multiple supplier pick-ups and a logistics station.

Although FIG. 1 illustrates full (or nearly full) loads going from one supplier to the cross dock 106, often a supplier 102 will not need to deliver a full truck 108 of material to the cross dock 106. A block diagram of the logistics system 100 showing the same truck 108 making multiple supplier pick-ups (i.e., a "milk run") based on a dynamically assigned route and schedule is illustrated in FIG. 2. In the example illustrated, truck 108a is originally scheduled to pick up material from supplier 102a, then supplier 102b, then supplier 102c before proceeding to the cross dock 106. Truck 108b is originally scheduled to pick up material from supplier 102d, then supplier 102e before proceeding to the cross dock 106.

Preferably, a manifest is updated at each stop. For example, the driver may be required to use a hand held bar code scanner to track each package that goes into and out of his truck by scanning a dynamic shipping label 200 which is discussed in greater detail below. Of course any method of updating the manifest may be used. For example, a manual system using a pencil and paper checklist may be used. Or a completely automated system using electronic proximity tags may be used. Alternatively, the system may be implemented using a manual system in conjunction with an automated system. Manifest data 202 representing the results of the manifest update may then be transmitted to a relay tower 204 that, in turn, forwards the data to a logistics station 206. The manifest data 202 may include, but is not limited to, the desired destination for each of the item or items in the truck, and may include a location identifier indicative of the location of the item. This location identifier may be on one or more levels. For example, the location identifier may be indicative of which truck the item (as represented by the dynamic shipping label 200) is in, and further may be indicative of the actual physical location of the truck. In the case of a manual system, a wireless telephone or data entry system may be used. The wireless telephone may be used in either a voice or a data mode to convey the manifest information. Wireless communication may also be used to convey manifest data 202 in a fully automated system. A GPS system may be employed in order to accord an actual physical location to the truck, which then would be indicated in the manifest data 202.

Upon scanning of the dynamic shipping label 200, the manifest data will now include, by way of example and not limitation, enough information to verify the actual location of the item represented by the dynamic shipping label 200, and enough information to report that location and any transfer of location (i.e., transfer of the item from a truck to a dock, from a truck to a cross dock, or from a cross dock to a truck) to the logistics station 206.

Once received, the manifest data 202 can be used to dynamically adjust the overall transportation strategy. For example, if the driver of truck 108a reports a palette is running 30 minutes late at supplier 102c, the logistics station 206 may inform the driver of truck 108a to continue on his normal schedule. Contemporaneously, the logistics station 206 may modify the schedule and manifest associated with truck 108b via a wireless schedule update 208. In this example, truck 108b was originally scheduled to proceed from supplier 102e to the cross dock 106. However, while in route, the driver of truck 108b may be notified to instead divert to supplier 102c to pick up the late palette as shown in FIG. 2.

Many factors may be needed to make this decision on the fly. Although in this example very few trucks are involved in the rescheduling, in practice there may be a large number of options for dynamically rescheduling the delivery of the goods. Each truck's current location, current excess capacity, future intended use of capacity, and other downstream affects such as what trucks 108 are "waiting" for a potentially diverted truck 108 and what those trucks 108 are carrying (or supposed to be carrying) may be factored into the schedule. One small change may ripple across multiple shipments. Uncontrolled, this ripple may be damaging to the efficiency of the system 100, but by carefully selecting and dynamically assigning a new overall routing strategy, the efficiency of the overall system 100 can be maximized.

This dynamic adjustment feature may also be used in conjunction with a "dynamic shipping label." In order to maximize the efficiency of a production plant 104, the receiver of goods typically wants to receive the goods as close as possible to where those goods are used. For example, one plant 104 may have three different production floors with six different receiving docks. Typical shipping labels include a postal address consisting of a street name, street number, city, and state.

Shippers may include a dock number on the shipping label. However, the particular dock (or even plant) may not be known when the parts are ordered. For example, relatively small assembly lines for intermittent production runs may be setup and torn down as needed to reuse existing factory space. In other words, the location of the assembly line need not be constant. Similarly, more than one factory may use the same part, but in varying quantities based on a variety of factors such as the day of the week or the existence of production problems.

In a tightly managed delivery system capable of dynamic adjustment, a unique identification code may be associated with each product. Preferably, the code is attached to the product in the form of a bar code or other machine readable code. The uniqueness of the code may be at many different levels. For example, each pallet may have a unique identification code, or a code assigned to each type of part may be combined with a code assigned to each overall product that part is used in.

The unique code is then associated with a physical mail address in the logistics station 206 or any central (or distributed) computer system database. If the logistics station 206 is updated, the carriers are updated. For example, if pallet #12345678 was originally destined for 123 Maple Dock #1, but prior to arrival at dock #1, a plant manager determines that he would prefer to receive the pallet at dock #2, the plant manager may simply enter the change into the logistics station 206 (e.g., via a web page). Subsequently, the driver of the truck carrying pallet #12345678 would be informed to deliver that pallet to dock #2 instead of dock #1. This update may be pushed to the driver (e.g., updated on a display screen available to the driver with a change alert), or the update may be polled by the driver (e.g., retrieved when a bar code associated with the pallet is scanned).

Figure 3:
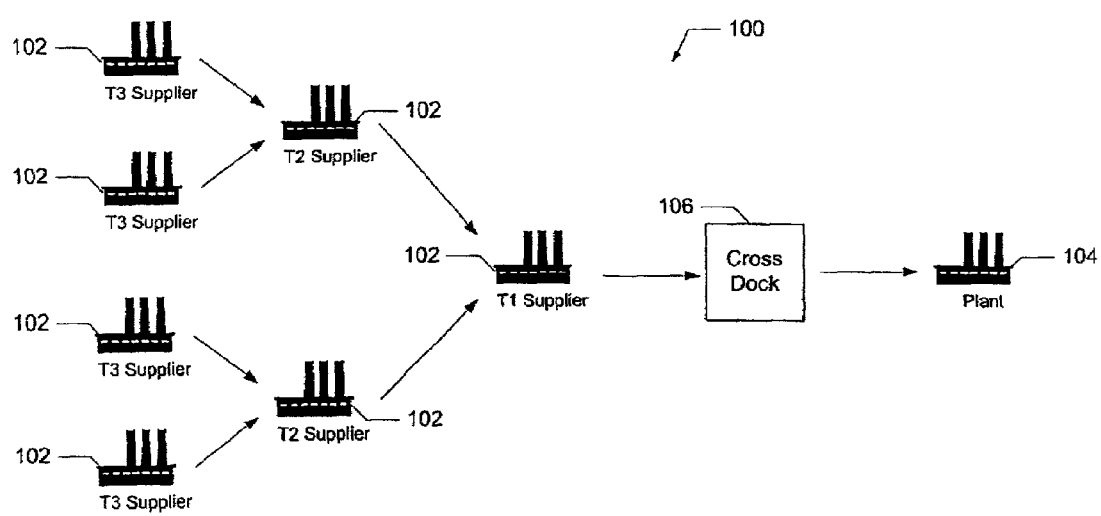
FIG. 3 is a block diagram of the logistics system of FIG. 1 showing suppliers shipping products to other suppliers, who in turn ship products to plants.

In addition to suppliers 102 shipping products to plants 104, suppliers 102 may ship products to other suppliers 102, who in turn ship products to plants 104 as shown in FIG. 3. Systems in which suppliers ship products to other suppliers are often called multi-tiered systems. Lower tier suppliers deliver their goods to higher tier suppliers. For example, a plurality of tier 3 suppliers (lower tier) may ship their products to a plurality of tier 2 suppliers (higher tier). In turn, the tier 2 suppliers may use the tier 3 products to produce their products that are then shipped to a plurality of tier 1 suppliers. Tier 1 suppliers may then ship their products to a cross dock 106 and/or a plant 104 (i.e., a plant 104 can be considered a tier 0 supplier, who in turn ships to the end consumer). Of course, a person of ordinary skill in the art will readily appreciate that any number and/or combination of tiers may be used in practice.

Figure 4:
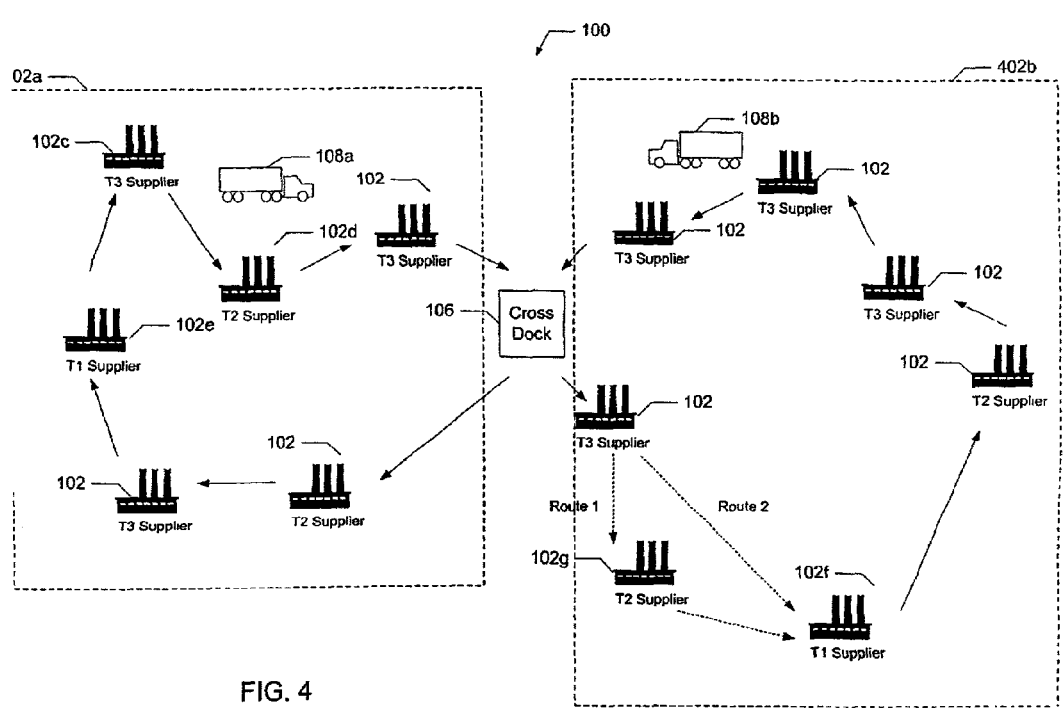
FIG. 4 is a block diagram of the logistics system of FIG. 1 showing multi-tier distribution including truck sharing and dock sharing.

All of the techniques disclosed herein are equally as applicable to these multiple tier distribution systems. For example, any tier may use cross docks and dynamic routing to supply any other tier. Further, different tiers may share trucks 108 and/or cross docks 106, etc. An example of a dynamically routed transportation system employing multiple tiers with truck sharing and dock sharing is illustrated in FIG. 4. Preferably, cross docks 106 are strategically located to serve as a center of a shipping cluster 402. Typically, closed loop truck routes are selected to maximize efficiency. In the example illustrated, truck 108a performs a clockwise loop of a western region which includes cluster 402a, while truck 108b performs a counter-clockwise loop of an eastern region which includes cluster 402b. Of course, the small number of trucks 108, suppliers 102, and routes in this example is for simplicity in explanation only. In practice, a much more complex routing scheme may be employed.

Within a loop, a higher tier may supply a lower tier using the same truck 108. For example, truck 108a may pick up material at tier 3 supplier 102c and move them to tier 2 supplier 102d. When truck 108a delivers the material to 102d, truck 108a may also pick up material at 102d which is destined for tier 1 supplier 102e. Larger shipping clusters 402 have the advantage of increasing the number of these tiered relationships, thereby decreasing shipping costs. However, larger shipping clusters 402 also increase shipping times and thereby increasing shipping costs. Accordingly, an optimal path that balances these tradeoffs is preferably chosen.

When goods are required to flow from one shipping cluster 402 to another shipping cluster 402, those goods may be exchanged at one or more cross docks 106. For example, if tier 2 supplier 102d has goods for tier 1 supplier 102f, the goods may be picked up at 102d by truck 108a, delivered to the cross dock 106, picked up at the cross dock 106 by truck 108b, and then delivered to tier 1 supplier 102f. In practice, there may be a large number of such transactions. In fact there may be a variety of different possibilities that will "work." Preferably, a particular combination of routes and timing windows are chosen by the logistics station 206 that maximize the overall efficiency of the system. Individual increases in shipping costs that are offset by overall shipping savings are preferably selected.

In addition to emergency rerouting (described above with reference to FIG. 2), dynamic scheduling allows for day-to-day changes in "regular" routing. For example, tier 2 supplier 102g in FIG. 4 may supply tier 1 supplier 102f. As previously discussed, truck 108b may simply pick up and drop off during his loop (route 1). However, if truck B's loop is scheduled as a daily loop (to maximize the overall efficiency of the shipping system), but supplier 102f only requires product from 102g every other day, then truck 102b may be scheduled by the logistics station 206 to take route 1 one day and route 2 the next day.

Figure 5:
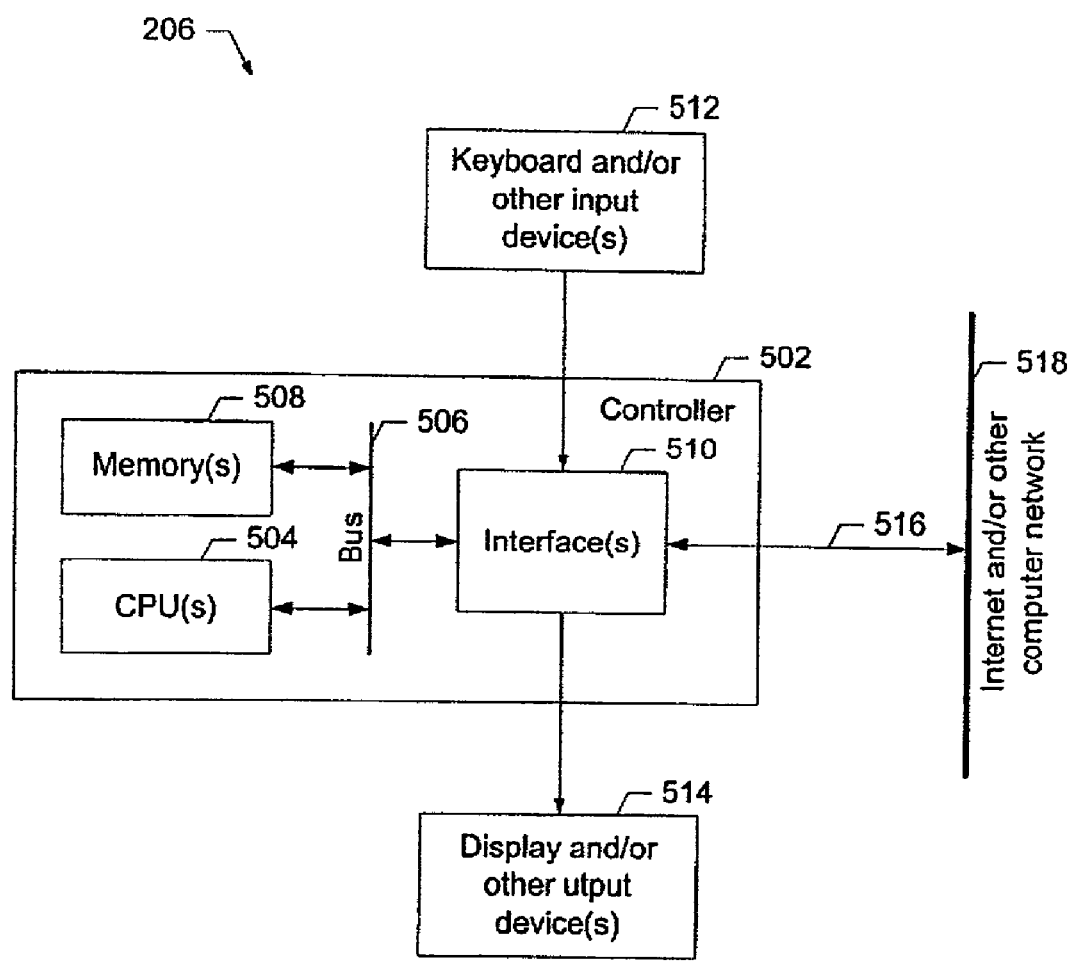
FIG. 5 is a more detailed block diagram of the logistics station of FIG. 2.

A more detailed diagram of the logistics station 206, is illustrated in FIG. 5. A controller 502 in the logistics station 206 preferably includes a central processing unit (CPU) 504 electrically coupled by an address/data bus 506 to a memory device 508 and an interface circuit 510. The CPU 504 may be any type of well known CPU, such as an Intel Pentium ™ processor. The memory device 508 preferably includes volatile memory, such as a random-access memory (RAM), and non-volatile memory, such as a read only memory (ROM) and/or a magnetic disk. The memory device 508 stores a software program that implements all or part of the method described below. This program is executed by the CPU 504, as is well known. Of course, a person of ordinary skill in the art will readily appreciate that the controller 502 may be implemented by any combination of hardware, firmware and/or software. Further, some of the steps described in the method below may be performed manually or without the use of the logistics station 206.

The interface circuit 510 may be implemented using any data transceiver, such as a Universal Serial Bus (USB) transceiver. One or more input devices 512 may be connected to the interface circuit 510 for entering data and commands into the controller 502. For example, the input device 512 may be a keyboard, mouse, touch screen, track pad, track ball, isopoint, and/or a voice recognition system.

An output device 514 may also be connected to the controller 502 via the interface circuit 510. Examples of output devices 514 include cathode ray tubes (CRTs), liquid crystal displays (LCDs), speakers, and/or printers. The output device 512 generates visual displays of data generated during operation of the logistics station 206. The visual displays may include prompts for human operator input, run time statistics, calculated values, and/or detected data.

The logistics station 206 may also exchange data with other computing devices via a connection 516 to a network 518. The connection 516 may be any type of network connection, such as an Ethernet connection and/or a wireless connection. The network 518 may be any type of network, such as a local area network (LAN) and/or the Internet.

Figure 6:
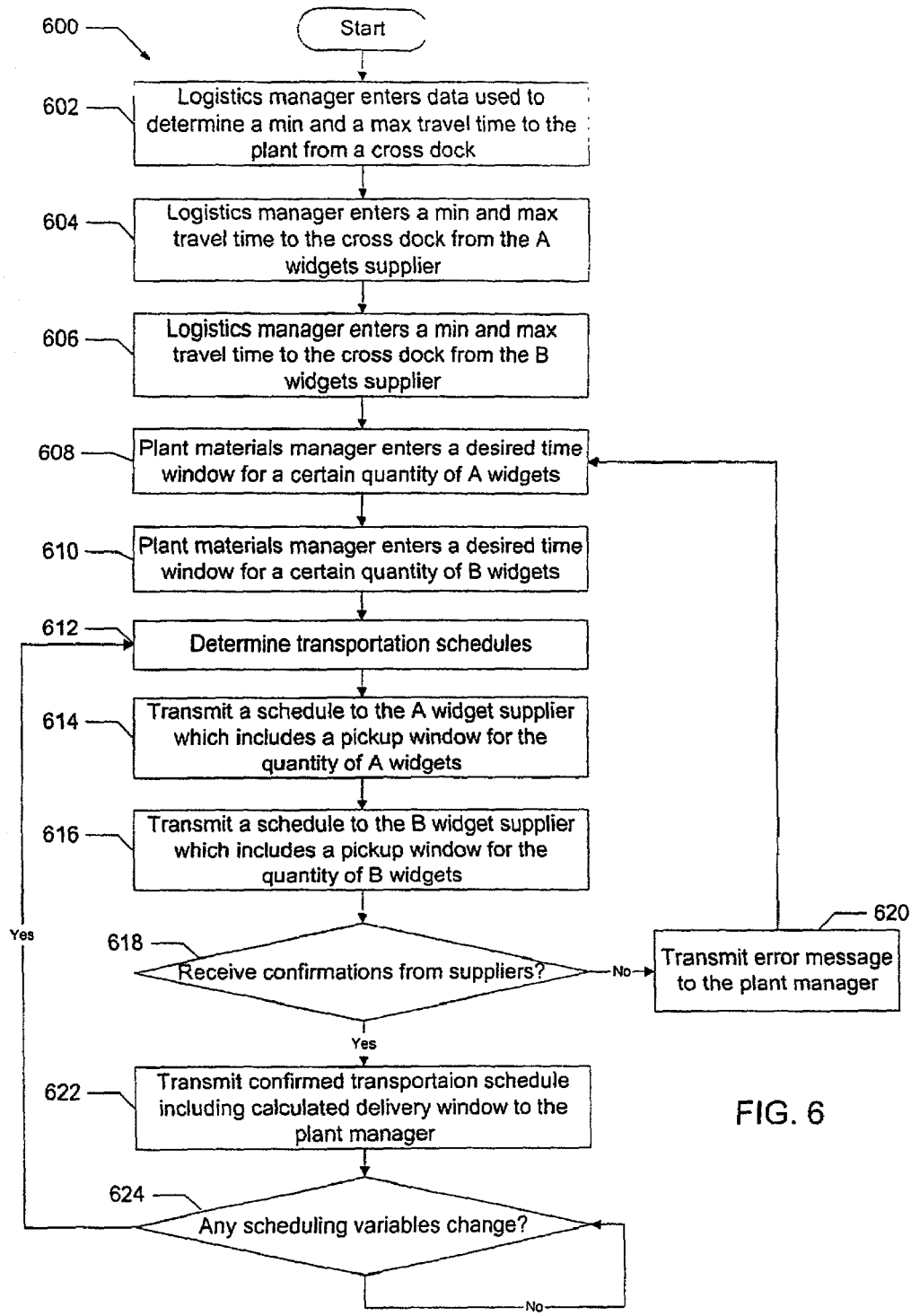
FIG. 6 is a flowchart representing a process of determining and communicating a transportation schedule.

A flowchart representing a process 600 that may be executed by the controller 502 and/or one or more people (e.g., plant managers, logistics managers, truck drivers, dock personal, etc.) to determine and communicate transportation schedules is illustrated in FIG. 6. Although for simplicity of discussion, this flow chart appears as, and will be discussed as occurring in a particular time sequence, persons of ordinary skill in the art will readily appreciate that the steps may be implemented in many temporal sequences without departing from the scope or spirit of the invention. Further, although certain types of people are used in the description below, a person of ordinary skill in the art will readily appreciate that any person or persons may fill any of the roles described below without departing from the scope or spirit of the present invention. For example, the same person may perform all of the data entry operations.

In general, the process 600 receives a plurality of timing data used to determine a transportation schedule. The transportation schedule is then transmitted to all of the effected parties. If the schedule(s) are not accepted and/or certain scheduling variables change, the schedule(s) may be recalculated.

More specifically, when the logistics station 206 is initialized and/or during a logistics station update, a logistics manager enters data used to determine a minimum and a maximum travel time from each cross dock 106 to each plant 104 serviced by the cross dock 106 (step 602). The minimum and maximum travel times may be entered directly (e.g., min=1 hour; max=1.4 hours), or data may be entered that is used to calculate or modify the minimum and maximum travel times. For example, actual travel times may be recorded in a database for statistical analysis. Many other variables may also be considered when determining the travel times. For example, the time of day and the weather conditions typically affect travel times in a fairly predictable manner.

Similarly, the logistics manager enters data used to determine a minimum and a maximum travel time from each supplier 102 to each cross dock 106 used by the supplier 102 (steps 604 and 606). Again, the minimum and maximum travel times may be entered directly, or data may be entered that is used to calculate or modify the minimum and maximum travel times.

Subsequently, a plant manager enters a desired time window for a certain quantity of a certain product (step 608). For example, the plant manger may determine that he needs a quantity of one-hundred "A" widgets for a production run at 1:00 PM. Accordingly, he may enter a forty minute time window for the widgets of between 12:20 PM and 12:50 PM. If the widgets arrive any earlier, the plant manager runs the risk of not having inventory space available to store the widgets. On the other hand, if the widgets arrive any later, the plant manager runs the risk of not having the widgets in place for his production run. However, if everything goes according to plan, the plant manager's requires only forty minutes worth of inventory, thereby reducing his costs (as compared to typical inventories). Other quantities of other products (e.g., "B" widgets) are entered in a similar manner (step 610). In this example, the "B" widgets are to arrive at the plant 104 during the same time window as the "A" widgets.

Optionally, the plant manager may indicate that one "end" of the desired time window is "fixed." For example, the plant manager may specify that the widgets are to arrive no later than 12:50 PM, or he may specify that the widgets are to arrive no earlier than 12:20 PM. Preferably, if no "fixed end" is specified, the logistics station 206 will center the actual delivery window around the desired delivery window as described in detail below. However, if a "fixed end" is specified, the logistics station 206 preferably adjusts the associated pickup and cross dock windows accordingly as described in detail below. In any event, the actual delivery window determined is preferably communicated to the plant manager. For example, if the plant manager is entering information via a web browser, the actual delivery window determined by the logistics station 206 may be immediately reported via a web page.

The information entered by both the logistics manager and the plant manger may then be used by the logistics station 206 to determine a transportation schedule (step 612). Preferably, the transportation schedule is determined by working backwards from the time(s) of desired delivery specified by the plant manager. The minimum and maximum travel times associated with each leg of the trip (e.g., supplier to cross dock and cross dock to plant) are then subtracted from the desired delivery time.

Once the transportation schedule is determined, it may be transmitted to the suppliers 102 (steps 614 and 616). Transmission of the schedule information may be via any communication medium. For example, the logistics station 206 may transmit the transportation schedule in the form of an e-mail message or a web page via the Internet. Alternatively, the schedule information may simply be communicated verbally over the telephone or via a fax transmission.

Optionally, the suppliers 102 may be required to acknowledge the schedule information with a confirmation message. The conformation message may indicate receipt and/or acceptance of the schedule. Like the transmission of the schedule information, the confirmation message may be via any communication medium. For example, the logistics station 206 may receive the confirmation message in the form of an e-mail message or a web page via the Internet. Alternatively, the confirmation message may simply be communicated verbally over the telephone or via a fax transmission.

If the logistics station 206 is waiting for a confirmation message (step 618), but the logistics station 206 does not receive a confirmation message after a predetermined period of time, an error message may be sent to the plant manager (step 620), for example, via a web page. Subsequently, the process 600 preferably loops back to allow the plant managers to enter a new delivery window for one or more components (step 608).

If the confirmation messages are received (step 618), the transportation schedule and/or the calculated delivery window is preferably transmitted to the plant manager (step 622). For example, if the plant manager requests delivery of the A widgets and the B widgets no later than 12:50 PM, and the calculated delivery window is 12:05 to 12:50, the calculated delivery window may be displayed on a web page generated by the logistics station 206 in response to the plant manager's entry of the desired time window(s).

Subsequently, if any of the variables associated with determining the transportation schedules changes, the process 600 preferably loops back to determine new transportation schedules (step 612). For example, if weather conditions change in a way that may affect travel times, new schedules may be determined and communicated to the suppliers 102. Similarly, if the plant 104 changes the type or quantity of an order, new schedules may be determined and communicated to the suppliers 102.

Figure 7:
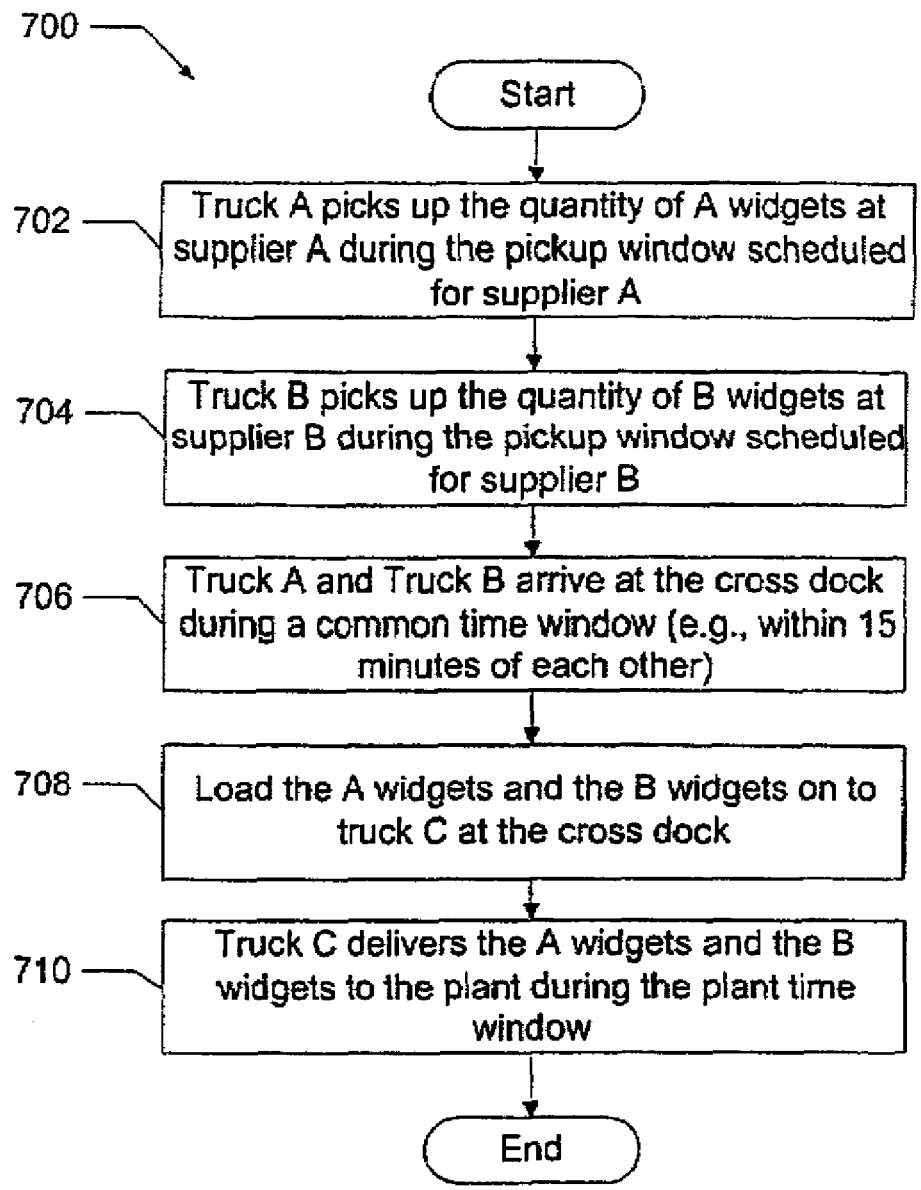
FIG. 7 is a flowchart representing a process of picking up and delivering goods according to the transportation schedule determined by the process of FIG. 6.

A flowchart representing a process 700 that may be executed by the truck drivers to pick up and deliver goods is illustrated in FIG. 7. Although for simplicity of discussion, this flow chart appears as, and will be discussed as occurring in a particular time sequence, persons of ordinary skill in the art will readily appreciate that the steps may be implemented in many temporal sequences without departing from the scope or spirit of the invention. Further, although trucks 108 are used as transportational vehicles in the description below, a person of ordinary skill in the art will readily appreciate that any type of transportational vehicle may be used without departing from the scope or spirit of the present invention.

The process begins when a first truck 108*a* picks up the quantity of A widgets at a supplier 102*a* during the pickup window scheduled for supplier 102*a* (step 702). Similarly, a second truck 108*b* picks up the quantity of B widgets at a supplier 102*b* during the pickup window scheduled for supplier 102*b* (step 704). If the travel time estimates prove to be accurate, truck 108*a* and truck 108*b* arrive at the cross dock 106 during a common time window (step 706). For example, the two trucks may arrive at the cross dock 106 within fifteen minutes of each other. At that time, the A widgets and the B widgets may be loaded onto a common truck 108*c* at the cross dock (step 708). Of course, truck 108*a* or truck 108*b* may used as the common truck, thereby reducing the number of widgets that must be transferred at the cross dock 106. On the other hand, if truck 108*a* and truck 108*b* need to wait a few more minutes to be part of another common time window, truck 108*c* may be used to continue the first process without delay. Finally, truck 108*c* delivers the A widgets and the B widgets to the plant 104 during the plant time window.

In order to encourage the use of the above described logistics system, a method and system for distributing the efficiencies gained by the system to all its participants is provided herein. In the preferred embodiment, the system stores agreed upon contract fee information in a computer-readable storage device, utilizes the above-described dynamic shipping system to ship goods for a customer, accepts the actual shipping cost associated with the shipping of goods, and calculates the payment due the shipping carrier based upon the stored contract fee information.

Figure 8:
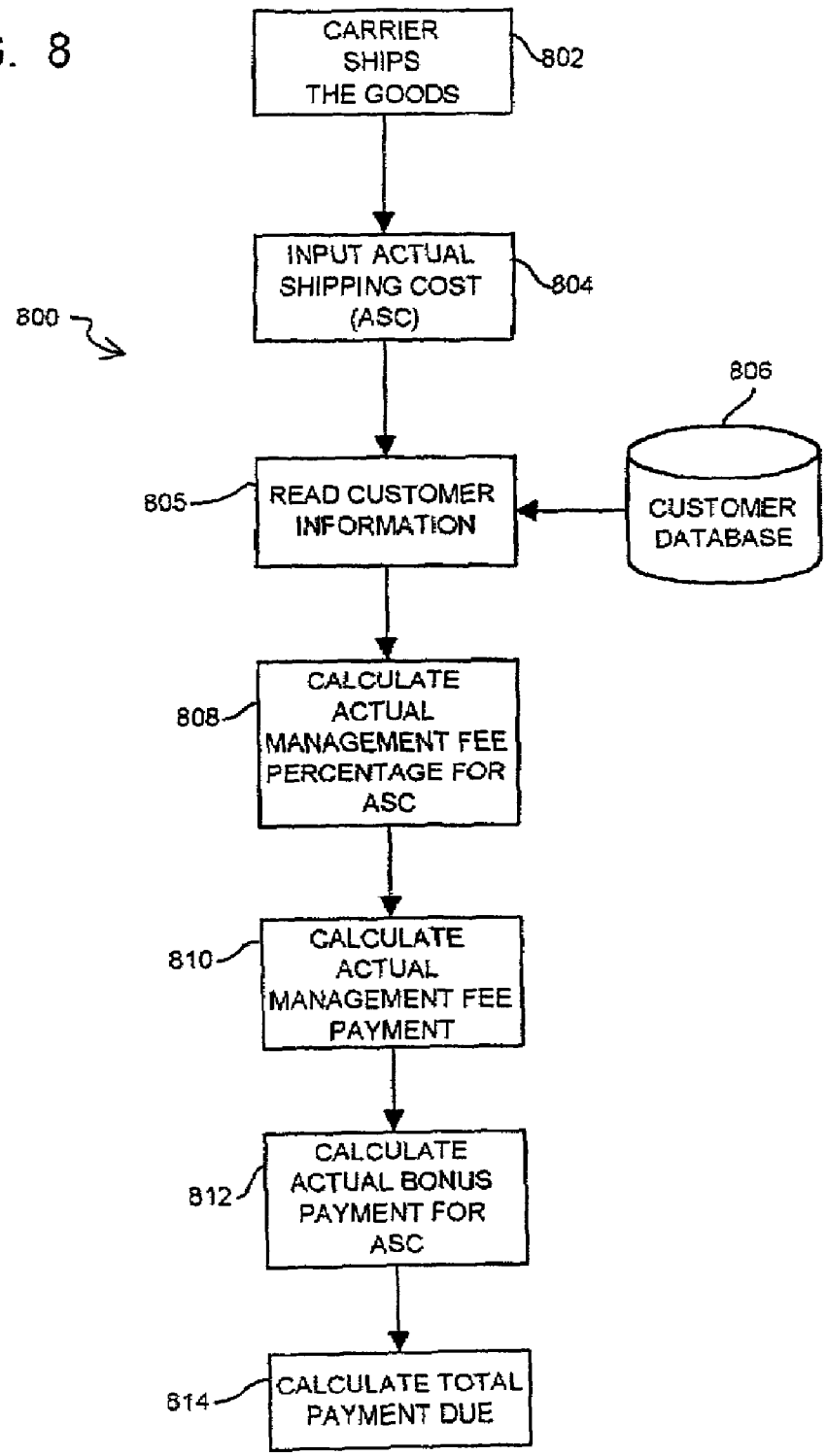
FIG. 8 is a flowchart representing a process of calculating a total payment due a shipping carrier.

Referring again to the drawings, and more particularly to FIG. 8, there is illustrated in block diagram form, a system 800 for compensating a shipping carrier according to an agreed upon management fee and an agreed upon bonus structure. The process begins by utilizing the above-described logistics system to ship customer goods to a prescribed destination (see step 802). Once the goods have been shipped, the actual shipping cost is input into the present system (step 804). The actual shipping cost contains the true amount spent by the shipping carrier, along with identifying information that may further identify such information as the customer, the actual goods shipped, and the date of the shipment.

The system then reads customer information stored on a customer database 806 (step 805). The customer information retrieved in step 805 contains a bonus payment structure 900, a management fee, a management fee percentage structure 902, a base-line shipping cost 904, and a shipping cost threshold 906. The retrieved customer information further contains any other relevant customer information such as billing information.

Turning to FIG. 9, there is depicted one illustration of a performance oriented shipping contract in chart form. The chart illustrates the bonus payment structure 900, the management fee percentage structure 902, the base-line shipping cost 904, and the shipping cost threshold 906. The base-line shipping cost 904 may be any shipping cost, however it will typically be defined as the price the customer historically paid through the use of other shipping methods. The base-line shipping cost 904 is also the shipping cost where the management fee percentage structure reaches a predetermined minimum percentage, as described below. The shipping cost threshold 906 establishes the shipping cost, below which the shipping carrier can start to earn a bonus payment and above which the shipping carrier earns less than the full management fee.

The management fee percentage structure 902 is a function of the shipping cost. In the preferred embodiment, the management fee percentage structure is one-hundred percent of the shipping cost for any shipping cost below the shipping cost threshold 906, gradually reduced to a predetermined minimum amount, for example, seventy-five percent, as the shipping cost increases above the shipping cost threshold 906 and approaches the base-line shipping cost 904. In the shipping contract illustrated, the management fee percentage structure 902 cannot fall below the predetermined minimum amount regardless of the increase in shipping cost.

The bonus payment structure 900 also is a function of the shipping cost. In the preferred embodiment, the bonus payment structure 900 is a linear function, defined as a percentage of the savings in the actual shipping cost relative to the shipping cost threshold 906. For example, in the shipping contract illustrated in FIG. 9, the bonus payment structure 900 is defined as forty percent of the difference between the actual shipping cost and the shipping cost threshold 906. Of course, the bonus payment structure 900 cannot be less than $0.

Returning to FIG. 8, after the customer information is retrieved from the customer database 906, the actual management fee percentage is calculated for the actual shipping cost (step 808). For example, as illustrated in FIG. 9, we see that if the actual shipping cost is $80, the actual management fee percentage will be one hundred percent. Once the actual management fee percentage has been calculated, the actual management fee payment due the shipping carrier is determined (step 810) by multiplying the actual management fee percentage calculated in the previous step by the management fee. As illustrated in the example, the shipping carrier earns one hundred percent of the management fee by keeping the actual shipping cost to $80. Therefore, for a management fee defined as $90, the carrier would earn the entire $90 management fee.

However, utilizing the same shipping contract illustrated in FIG. 9, and assuming an actual shipping cost of $100, the actual management fee percentage will be seventy-five percent. Therefore, for a management fee defined as $90, the actual management fee would be seventy-five percent of $90, or $67.50.

The system then calculates the actual bonus payment due the shipping carrier (step 812), based upon the input actual shipping cost. Again, as illustrated in FIG. 9, the actual bonus payment is forty percent of the difference between the shipping cost threshold 906 and the actual shipping cost. Thus, using an actual shipping cost of $80, the actual bonus payment is calculated as forty percent of the difference between shipping cost threshold 906 ($90) and the actual shipping cost ($80), which is $4. If the actual shipping cost is assumed to be $100, the actual bonus payment is calculated as forty percent of the difference between the shipping cost threshold 906 ($90) and the actual shipping cost, which is negative $4. However, the actual bonus payment may not be less than zero, therefore the actual bonus earned is $0.

The total payment due is then calculated as the sum of the actual management fee and the actual bonus payment (step 814). Thus, the total payment earned in the illustration where the actual shipping cost is $80 would be $94 ($90 management fee plus $4 bonus payment). The total payment earned in the illustration where the actual shipping cost is $100 would be $67.50 ($67.50 management fee plus $0 bonus payment). Of course, many other thresholds and functions may be used in a similar manner.

In summary, persons of ordinary skill in the art will readily appreciate that a method and system for managing carrier operations to dynamically route products from one manufacture to another manufacture in a cost effective manner has been provided. Systems implementing the teachings of this system can enjoy decreased shipping costs.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

The invention claimed is:

1. A method for transporting goods comprising:
    (a) determining that a first set of goods, located at a first supplier, and a second set of goods, located at a second supplier, are desired at a plant during a plant time range,
    (b) estimating a plant shipment time including receiving data indicative of a weather condition said plant shipment time comprising a minimum and maximum time of travel between a cross dock location and the plant,
    (c) estimating a first cross dock shipment time, said first cross dock shipment time comprising a minimum and maximum time of travel between said first supplier and said cross dock location,
    (d) estimating a second cross dock shipment time,
    said second cross dock shipment time comprising a minimum and maximum time of travel between said second supplier and said cross dock location,
    (e) determining a first scheduled pickup time range based on said plant time range, said estimation of said plant shipment time, and said estimation of said first cross dock shipment time,
    (f) determining a second scheduled pickup time range based on said plant time range, said estimation of said plant shipment time, and said estimation of said second cross dock shipment time,
    (g) picking up said first set of goods from said first supplier during said first scheduled pickup time range,
    (h) delivering said first set of goods to said cross dock location,
    (i) picking up said second set of goods from said second supplier during said second scheduled pickup time range,
    (j) delivering said second set of goods to said cross dock location,
    (k) combining said first set of goods and said second sets of goods into a combination of goods, and
    (l) delivering said combination of goods to said plant during said plant time range.

2. The method of claim 1, further comprising the steps of associating a first unique identifier with said first set of goods and associating a second unique identifier with said second set of goods.

3. The method of claim 2, wherein said first unique identifier is indicative of at least one of an origin code, a product code, a quantity code, and an item characteristic code.

4. The method of claim 1, wherein said plant is a supplier at a first tier and said first supplier is a supplier at a second tier, wherein said first tier is higher than said second tier.

5. The method of claim 1, further including the step of transmitting the first scheduled pickup time range to the first supplier and transmitting the second scheduled pickup time range to the second supplier.

6. The method of claim 5, wherein the step of transmitting the first scheduled pickup time range to the first supplier comprises the step of transmitting the first scheduled pickup time range via the Internet.

7. The method of claim 1, wherein the step of estimating a plant shipment time comprises the step of retrieving actual travel times from a database.

8. The method of claim 1, wherein the step of estimating a plant shipment time comprises the step of receiving a time of day during which travel is to take place.

9. The method of claim 1, wherein the step of estimating a first cross dock shipment time comprises the step of retrieving actual travel times from a database.

10. The method of claim 1, wherein the step of estimating a first cross dock shipment time comprises the step of receiving a time of day during which travel is to take place.

11. The method of claim 1, wherein the step of estimating a first cross dock shipment time comprises the step of receiving data indicative of a weather condition.

12. The method of claim 1, further comprising the steps of picking up a third set of goods and delivering said third set of goods to said first supplier during said first scheduled pickup time range.

13. The method of claim 12, wherein said third set of goods is located at said cross dock location.

14. The method of claim 12, wherein said third set of goods is located at a second cross dock location.

15. The method of claim 12 wherein said third set of goods is located at a third supplier.

16. The method of claim 15, further comprising the step of determining a third scheduled pickup time range, said third scheduled pickup time range based on said first scheduled pickup time range and an estimation of the time of travel between said third supplier and said first supplier.

17. The method of claim 16, further comprising the step of transmitting said third scheduled pickup time range to said third supplier.

18. The method of claim 17, wherein the step of transmitting said third scheduled pickup time range to said third supplier comprises the step of transmitting said third scheduled pickup time range via the Internet.

19. A system for transporting goods comprising:
    one or more controllers configured to
        determine that a first set of goods, located at a first supplier, and a second set of goods, located at a second supplier, are desired at a plant during a plant time range,
        estimate a plant shipment time including receiving data indicative of a weather condition, said plant shipment time comprising a minimum and maximum time of travel between a cross dock location and the plant,
        estimate a first cross dock shipment time, said first cross dock shipment time comprising a minimum and maximum time of travel between said first supplier and said cross dock location,
        estimate a second cross dock shipment time, said second cross dock shipment time comprising a minimum and maximum time of travel between said second supplier and said cross dock location, determine a first scheduled pickup time range based on said plant time range, said estimation of said plant shipment time, and said estimation of said first cross dock shipment time, and determine a second scheduled pickup time range based on said plant time range, said estimation of said plant shipment time, and said estimation of said second cross dock shipment time; and one or more mobile units configured to pick up said first set of goods from said first supplier during said first scheduled pickup time range, deliver said first set of goods to said cross dock location, pick up said second set of goods from said second supplier during said second scheduled pickup time range, deliver said second set of goods to said cross dock location, and deliver a combination of goods to said plant during said plant time range, said combination of goods comprising said first set of goods and said second set of goods.

* * * * *